(12) United States Patent
Greenberg et al.

(10) Patent No.: US 7,835,303 B2
(45) Date of Patent: *Nov. 16, 2010

(54) PACKET-SWITCHED NETWORK TOPOLOGY TRACKING METHOD AND SYSTEM

(75) Inventors: Albert Gordon Greenberg, Seattle, WA (US); Aman M. Shaikh, Summit, NJ (US)

(73) Assignee: AT&T Intellectual Property II, L.P., Reno, NV (US)

( * ) Notice: Subject to any disclaimer, the term of this patent is extended or adjusted under 35 U.S.C. 154(b) by 337 days.

This patent is subject to a terminal disclaimer.

(21) Appl. No.: 11/695,352

(22) Filed: Apr. 2, 2007

(65) Prior Publication Data

US 2007/0165546 A1    Jul. 19, 2007

Related U.S. Application Data

(63) Continuation of application No. 10/063,867, filed on May 21, 2002, now Pat. No. 7,200,120.

(60) Provisional application No. 60/292,415, filed on May 21, 2001.

(51) Int. Cl.
*H04L 12/28* (2006.01)
(52) U.S. Cl. .................................. 370/254; 370/395.31
(58) Field of Classification Search ............... 370/254, 370/255; 709/238, 223
See application file for complete search history.

(56) References Cited

U.S. PATENT DOCUMENTS

| | | | |
|---|---|---|---|
| 5,331,637 A | 7/1994 | Francis et al. | |
| 5,546,540 A | 8/1996 | White | |
| 5,926,463 A | 7/1999 | Ahearn et al. | |
| 6,094,682 A | 7/2000 | Nagasawa | |
| 6,363,319 B1 | 3/2002 | Hsu | |
| 6,574,663 B1 * | 6/2003 | Bakshi et al. | 709/223 |
| 6,600,724 B1 | 7/2003 | Cheng | |
| 6,650,626 B1 | 11/2003 | Cain | |
| 6,728,214 B1 | 4/2004 | Hao et al. | |
| 6,744,739 B2 * | 6/2004 | Martin | 370/254 |
| 6,751,660 B1 | 6/2004 | Mansingh et al. | |
| 6,820,134 B1 * | 11/2004 | Zinin et al. | 709/238 |
| 6,823,395 B1 | 11/2004 | Adolfsson | |
| 6,871,235 B1 | 3/2005 | Cain | |
| 6,944,159 B1 | 9/2005 | Fotedar et al. | |
| 6,944,675 B2 | 9/2005 | Fujita | |
| 6,980,537 B1 | 12/2005 | Liu | |
| 6,985,959 B1 | 1/2006 | Lee | |
| 7,002,917 B1 | 2/2006 | Saleh | |
| 7,200,120 B1 | 4/2007 | Greenberg et al. | |
| 7,437,476 B2 | 10/2008 | Zinin et al. | |
| 2001/0053149 A1 | 12/2001 | Mo et al. | |
| 2002/0141378 A1 | 10/2002 | Bays et al. | |
| 2002/0163884 A1 | 11/2002 | Peles et al. | |
| 2002/0176359 A1 | 11/2002 | Durinovic-Johri et al. | |

(Continued)

OTHER PUBLICATIONS

A Model for Generation and Processing of Link State Information in SAAM architecture; H. Huseyin Uysal; Mar. 2000.

(Continued)

*Primary Examiner*—Albert T Chou (57) ABSTRACT

The present invention permits a network operator to maintain a timely view of changes to an operational packet-switched network.

9 Claims, 6 Drawing Sheets

U.S. PATENT DOCUMENTS

| | | |
|---|---|---|
| 2002/0196802 A1 | 12/2002 | Sakov et al. |
| 2003/0026212 A1 | 2/2003 | Martin |
| 2003/0026268 A1 | 2/2003 | Navas |
| 2003/0058804 A1 | 3/2003 | Saleh et al. |
| 2004/0233859 A1 | 11/2004 | Martin |
| 2005/0099958 A1 | 5/2005 | Freedman |
| 2005/0198250 A1 | 9/2005 | Wang |
| 2006/0069779 A1 | 3/2006 | Sundqvist et al. |

OTHER PUBLICATIONS

Performance Analysis and Improvement of the Open Shortest Path First Routing Protocol; Mahad A. Ahmed, B. Eng; Sep. 1999.

Making Qos Aware Multicast Scalable in Terms of Link State Advertisement; Toshihiko et al.; IEEE 2001.

* cited by examiner

701 — HoldTime OBJECT
TYPE: 1
DIRECTION ALLOWED: LSAG <--> LSAR
VALUE: HoldTime VALUE USED IN SECONDS (4 OCTETS)

702 — Subscribe OBJECT
TYPE: 2
DIRECTION ALLOWED: LSAG --> LSAR
VALUE: A LIST OF AREA IDs THE
       LSAG WANTS TO SUBSCRIBE FOR

703 — Unsubscribe OBJECT
TYPE: 3
DIRECTION ALLOWED: LSAG --> LSAR
VALUE: A LIST OF AREA IDs THE
       LSAG WANTS TO UNSUBSCRIBE FOR

704 — Detached-area OBJECT
TYPE: 4
DIRECTION ALLOWED: LSAG <-- LSAR
VALUE: A LIST OF AREA IDs THE LSAG IS NOT
       ATTACHED TO (DOES NOT MEAN THAT
       LSAG ATTACHED TO ALL THE REMAINING AREAS)

705 — Attached-area OBJECT
TYPE: 5
DIRECTION ALLOWED: LSAG <-- LSAR
VALUE: A LIST OF AREA IDs THE LSAG IS ATTACHED TO

706 — TopologyInfo OBJECT
TYPE: 7
DIRECTION ALLOWED: LSAG <--> LSAR
VALUE: AREA ID (4 OCTETS), LIST OF LSAs

PACKET-SWITCHED NETWORK TOPOLOGY TRACKING METHOD AND SYSTEM

CROSS REFERENCE TO RELATED APPLICATIONS

This application is a continuation of U.S. Ser. No. 10/063,867 filed May 21, 2002, now U.S. Pat. No. 7,200,120 which claims priority to U.S. Provisional Application Ser. No. 60/292,415, filed on May 21, 2001, the contents of which are incorporated by reference herein.

BACKGROUND OF INVENTION

The present invention relates to network management, and, more particularly, to constructing network-wide views of the topology of a packet-switched network.

Packet-switched networks, such as networks based on the TCP/IP protocol suite, can be utilized by a network operator to provide a rich array of services. Networks of routers that store and forward Internet Protocol (IP) packets are becoming the single ubiquitous network for almost all communication needs. Within a single Autonomous System (AS) in an IP network, routing of packets is controlled by an interior gateway protocol, such as OSPF (Open Shortest Path Forwarding). See, e.g., J. Moy, "OSPF Version 2," Request for Comments 2328, Internet Engineering Task Force (IETF), Network Working Group, April 1998, which is incorporated by reference herein. OSPF is a "link state" routing protocol, meaning that each router within the AS discovers and builds an entire view of the network topology. Every router running OSPF is responsible for describing a certain part of the network in a Link State Advertisements (LSA) which is flooded reliably to other routers in the network. The LSAs are utilized by each router to construct a weighted topological graph which the router uses to compute a shortest path tree. The router thereby builds a forwarding table that assures that packets are forwarded along the shortest paths in terms of link weights to their destination.

As users depend increasingly on a common packet-switched infrastructure for mission-critical needs, they require that the network provide increased reliability and support for new services. Systems for managing IP networks today, unfortunately, are targeted at element-level fault diagnosis and troubleshooting—and not to meet stringent needs of real-time resource tracking or provisioning for a given customer. For instance, to ensure reliability of the network it is important to ascertain customers who will be impacted by a particular interface failure. To provision capacity, e.g. for a given virtual leased line, it is critical to know the current topology of the network and thus know the path that the data for the line will follow. Current systems offer insufficient predictability in the network for a service provider to learn the paths that may be taken by some particular portion of the traffic coming into the network.

SUMMARY OF INVENTION

The present invention permits a network operator to maintain a timely view of changes to an operational packet-switched network. In accordance with an aspect of the invention, an architecture is provided enabling the tracking of intradomain topology by passively monitoring the existing reliable link state flooding mechanism of an intradomain routing protocol such as OSPF. It is preferable to divide the topology tracking mechanism into two functional components: "reflectors" which are responsible for passively receiving the link state information and an "aggregator" which collects the topology information to form an overall view of the entire domain, that is accessible to other network monitoring applications. The aggregator subscribes to one or more of the reflectors with regard to particular areas of the network. The reflectors can be incorporated functionally into network routers or preferably can be established in an adjacency with a pre-existing router. Where OSPF is the routing protocol utilized, the reflector can take advantage of an intermediate loading state in the protocol to establish an adjacency with the router without impacting the routing behavior of the rest of the network.

The present invention advantageously requires no changes to existing network routing or management protocols or systems. The present invention imposes no penalties on packet routing, forwarding, or network reliability. The view of topology maintained by the system is identical to that in the router databases. Following an event that changes the topology of the network, the aggregator's view should converge to the new view near the time that the routers themselves converge to the new view. Moreover, updates to the topology can be reliably and rapidly detected. These and other advantages of the invention will be apparent to those of ordinary skill in the art by reference to the following detailed description and the accompanying drawings.

DETAILED DESCRIPTION

Figure 1:
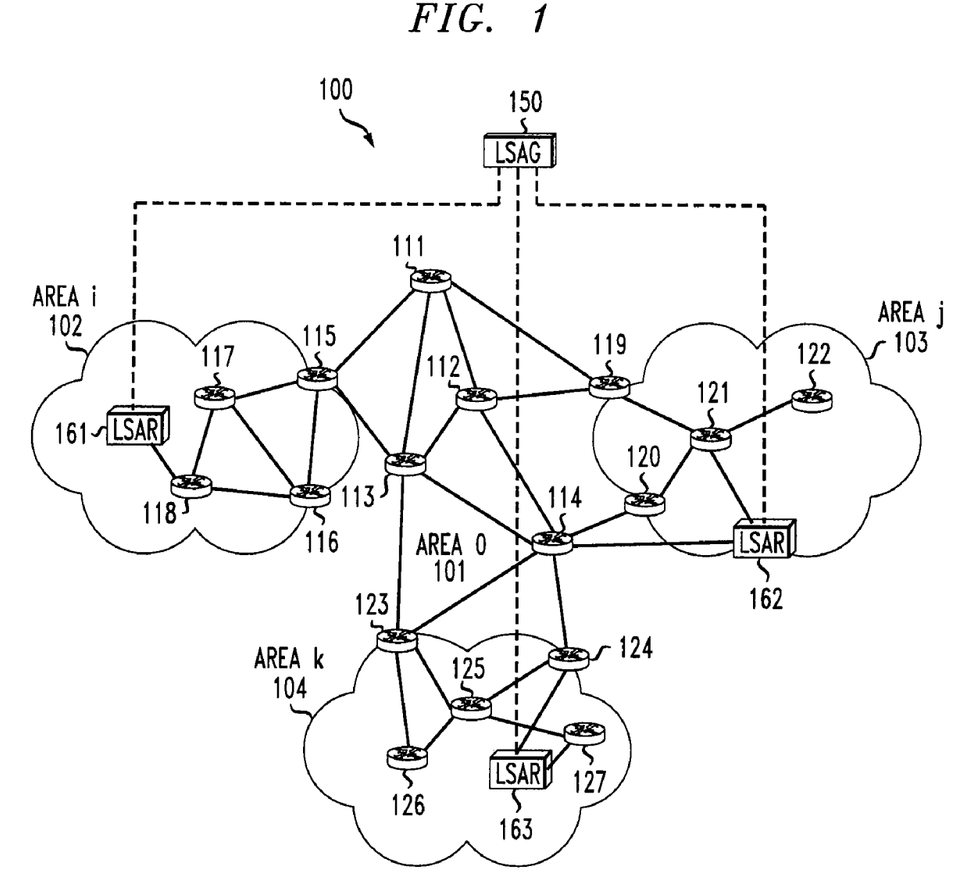
FIG. 1 is a diagram of a packet-switched network, illustrating a preferred embodiment of the invention.

FIG. 1 is a diagram of a packet-switched network 100 illustrating a novel and advantageous approach to network topology tracking, in accordance with a preferred embodiment of the invention. The packet-switched network 100 comprises a plurality of routers 111-127 connected, as shown in FIG. 1, to form an arbitrary topology. The routers 111-127 are assumed, for purposes of the description herein, to be part of a single autonomous system and utilizing a link state routing protocol such as OSPF. Accordingly, as is known in the art, it is advantageous to divide the OSPF domain into areas: a backbone area 101 which provides connectivity to one or more non-backbone areas, e.g. areas 102, 103, 104 in FIG. 1. Every link in the network is assigned to exactly one area. Routers that have links to multiple areas are referred to in the art as border routers, e.g. border routers 115, 116, 119, 120, 123, 124 in FIG. 1. Every router 111-127 need only maintain a copy of the topology graph for each area to which it is connected. The routers 111-127 utilize reliable flooding of LSAs to distribute topology information.

In accordance with a preferred embodiment of an aspect of the invention, the task of collecting topology information and synthesizing a global view of the network topology is divided into two principal functional components: referred to by the inventors as an LSA "aggregator" ("LSAG") 150 and one or more LSA "reflectors" ("LSAR"s) 161, 162, 163. The LSA reflectors 161, 162, 163 are responsible for collecting LSA information that a link state protocol such as OSPF naturally floods throughout each network area to ensure that the routers arrive at a common view of the network topology. Each LSA reflector forwards that information to the LSA aggregator which "aggregates" the topology view of each LSA reflector into a single view of the entire OSPF domain. Separating the LSAR and LSAG functions advantageously provides a degree of fault isolation; each function can be simplified and replicated independently to increase overall reliability. Another benefit is that the LSAG may subscribe to a subset of the LSAs, for example, just the router and network LSAs for a given OSPF area. Moreover, separating the LSAG from the LSAR function allows a network operator to conduct significant modifications to the LSAG, e.g. as new functionalities are added, without disturbing the operation of the LSARs.

The structure and operation of the LSA aggregator 150 and the LSA reflectors 161, 162, 163 are explained in further detail herein.

Figure 2:
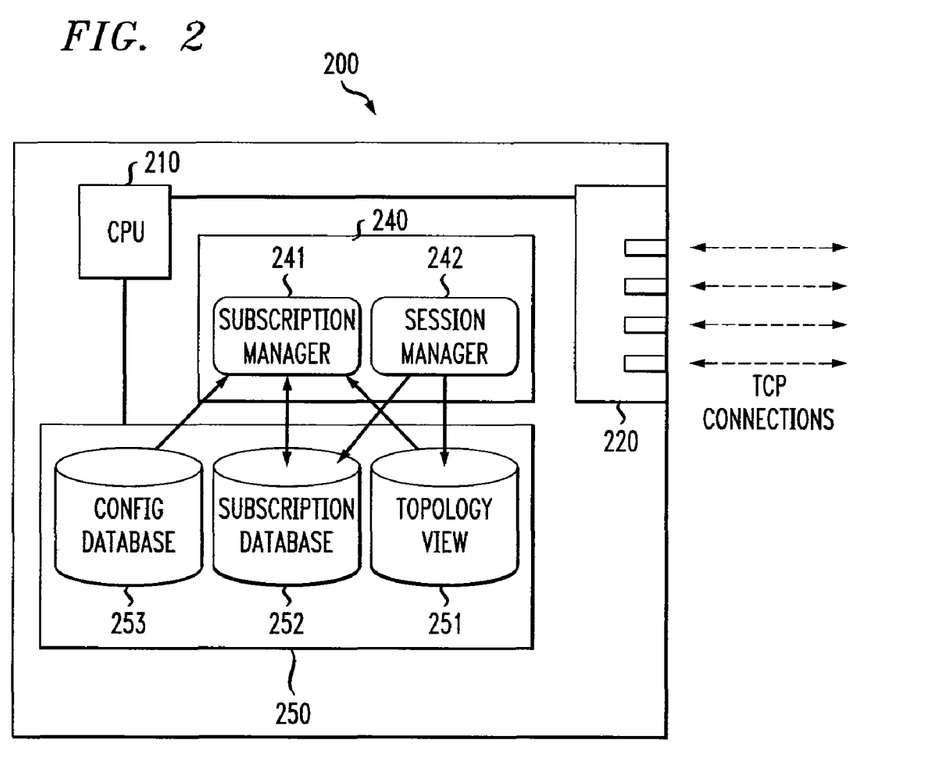
FIG. 2 is simplified diagram of the components of an LSA aggregator, in accordance with a preferred embodiment of the invention.

LSA AGGREGATOR. The LSA aggregator 150 is responsible for handling all complex logic in tracking the network topology: e.g., storing and managing the topology updates, filling in an appropriate topology data model, and providing advantageous application programming interfaces to applications that require network topology views. FIG. 2 shows a high-level architectural view of an advantageous embodiment of an LSA aggregator 200. The LSAG 200 can be a conventional server computer—typically comprising a storage device 250, a network interface 220, all connected to one or more central processing units 210 operating under the control of software program instructions stored in a memory unit 240. The storage device 250 is typically a fast hard disk, which is utilized by the central processing unit 210 to store three main databases: a topology view 251, a subscription database 252, and a configuration database 253. It is advantageous to roughly divide the software program instructions into two main program modules: a subscription manager 241 and a session manager 242.

Figure 3:
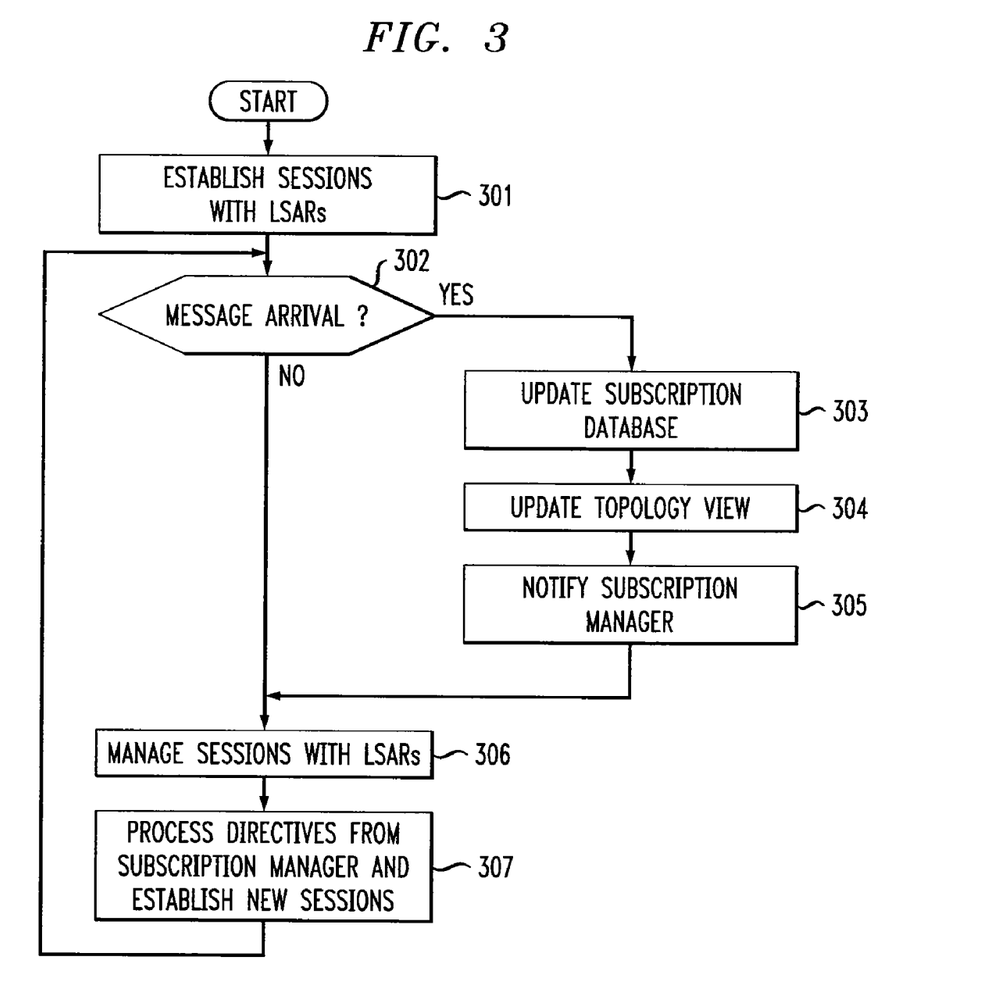
FIG. 3 is a flowchart of processing performed by the LSA aggregator shown in FIG. 2.

The session manager 242 performs the task of managing communication sessions with the various LSARs. FIG. 3 sets forth a simplified flowchart of the processing performed by the LSAG, as the session manager checks for various session events. At step 301, the session manager establishes a set of initial sessions with the LSARs per the direction of the subscription manager. For example and without limitation, the LSAG can use its network interface(s) to establish TCP connections to the relevant LSAR(s). The LSAG and the LSAR can communicate using an advantageous message protocol, such as the LSAG-LSAR protocol described in further detail below. At step 302, the session manager monitors the sessions for any incoming messages. If a message has arrived, the session manager will proceed to process the message, depending on the message contents. At step 303, the session manager will update the subscription database, as described in further detail herein. At step 304, the session manager will update the topology view, where the LSAR communicates a message indicating a change to the network topology. At step 305, the session manager will notify the subscription manager when any relevant changes to the topology or to the subscriptions have occurred. At step 306, the session manager manages the sessions, for example by sending "keep-alive" messages to an LSAR, resetting connection timers, etc. At step 307, the session manager processes any directives received from the subscription manager, including any directives to establish a new session or close an existing session with an LSAR.

Figure 4:
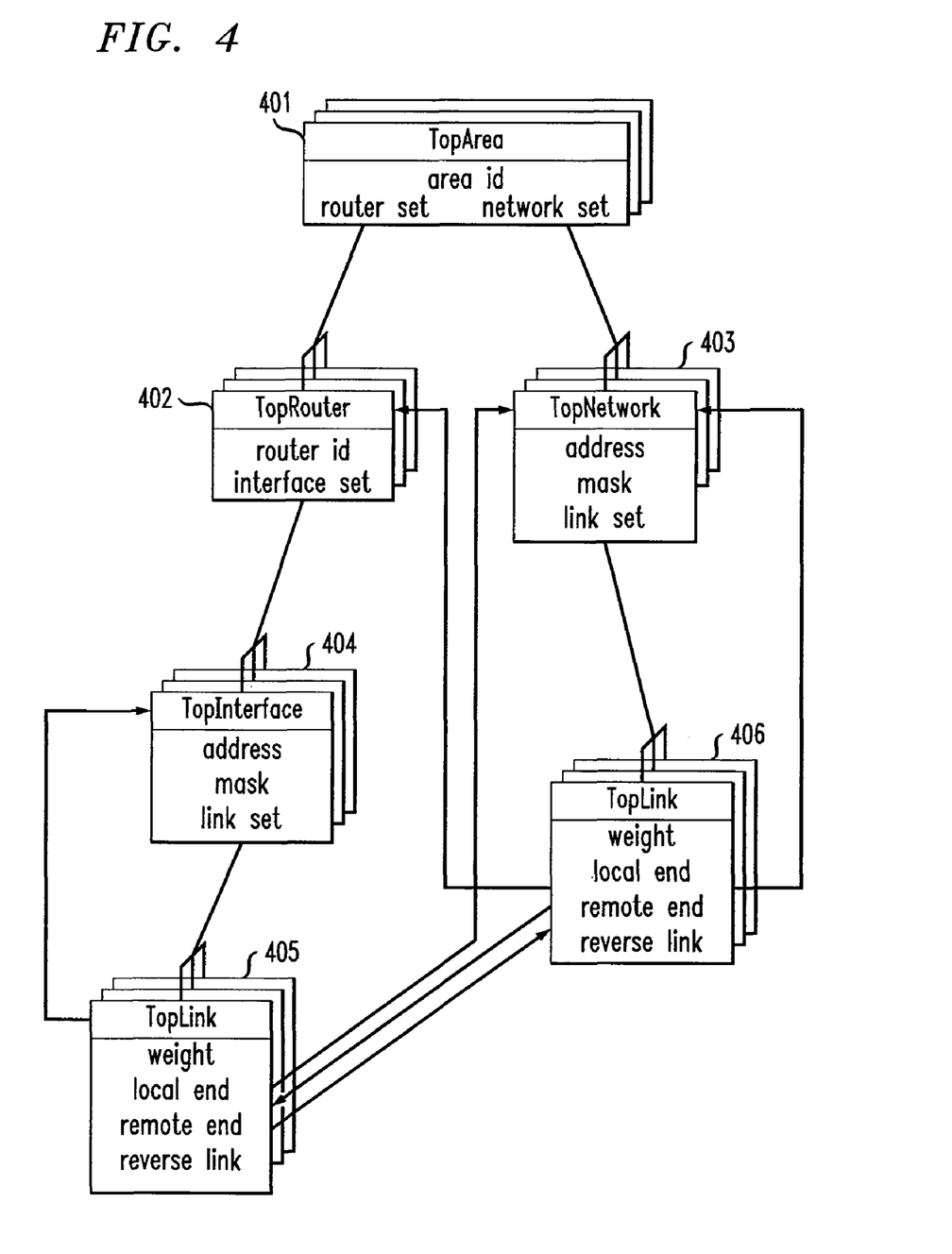
FIG. 4 is an abstract representation of a topology data structure model.

Accordingly, the session manager builds and updates the topology view using the messages received from each LSAR. The data structures underlying the topology view are accessible to various applications, preferably using an application programming interface. FIG. 4 shows an abstract representation of an advantageous topology data structure model maintained by the LSAG. Five data types are used to store the topology information. The structures and their relationships are shown in FIG. 4. The TopArea 401 structure contains information related to an OSPF area, such as the area-id. Structures TopRouter 402 and TopNetwork 403 represent a router and a network (e.g., a local area network) in the area. Each TopArea 401 node contains a set of TopRouter 402 and TopNetwork 403 nodes, thereby representing all the routers and networks in the area. The structure—TopInterface 404 represents a single physical interface on a router. Thus, each TopRouter 402 node has a set of TopInterface 404 nodes corresponding to all the interfaces the router has in the given area. Finally, the structures TopLink represents a link between a router-router pair 405 or a router-network pair 406. Separate structures are designated for an interface and a link because OSPF allows multiple logical links over a single physical link, e.g. in the case of point-to-multipoint links. Thus, every interface has a set of TopLink nodes, thereby allowing us to store multiple links for a single interface. A TopNetwork 403 node directly stores its set of TopLink nodes. Each link node represents a unidirectional link with its OSPF weight. The link also stores a reference to its local end which could be a TopInterface node or a TopNetwork node, and a reference to its remote node which could be a—TopRouter or a TopNetwork node. The link also stores a reference to the reverse link if one exists. Note that a link can exist between a pair of routers or between a router and a network but not between a pair of networks. The aims of the data structure design in FIG. 4 are simplicity and generality. It is advantageous for the structure to mirror those of the OSPF builds in the routers' link state databases, thereby allowing easy verification and comparison of the functionality of different implementations. Alternative structures may also be utilized that are better adapted to rapid search or other applications.

Figure 5:
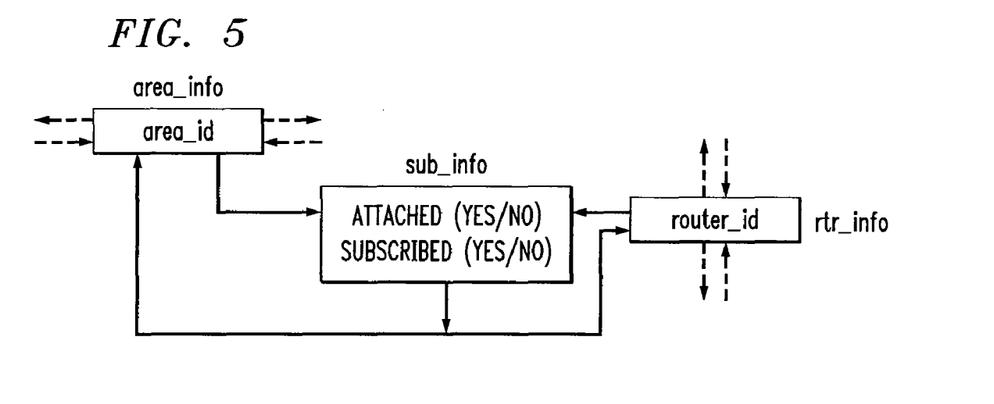
FIG. 5 is an abstract representation of the organization of a subscription database.

The subscription manager 241 decides which LSAR to contact and what network areas to subscribe for. The subscription database 252 contains this subscription related information, for example in a database structure organized as shown in FIG. 5. The sub_info structure is indexed by both the area ID and the router ID of an LSAR. The sub_info structure basically has two parameters: attached which indicates whether the associated LSAR is attached to the corresponding area; and subscribed which indicates whether the LSAG has subscribed to the LSAR for the area or not. These two parameters are orthogonal to each other, so there are four possible combinations. The subscription database should keep all entries for which—attached and subscribed both have a value of "yes", but it is also advantageous to the subscription manager to keep other entries. For example, the subscription manager can lookup entries which are attached to a given area but to which it is not subscribed in order to subscribe to the area at some later time when another subscribed LSAR finds itself detached from the area. It should be noted that the structure shown in FIG. 5 is merely illustrative; although area_info and rtr_info structures are shown arranged in a doubly linked list, they can be readily implemented in other more efficient structure such as a Patricia tree.

As the session manager 242 receives various messages from the LSARs, it updates the subscription database 252. Any changes, for example in the attached or subscribed parameter, are communicated back to the subscription manager 241. In accordance with an embodiment of another aspect of the invention, the subscription manager 241 can then run a "decision" algorithm to select a course of action. For example and without limitation, consider an LSAG that has established a session with an LSAR and has subscribed for some given area A. At some point, the LSAR gets detached from area A and sends this information to the LSAG using the protocol described below. This message is received by the session manager 242 which then updates the subscription database 252 and informs the subscription manager 241 of this change. The subscription manager 241 can then ask the session manager 242 to establish a session with some other LSAR to subscribe for area A. The subscription manager 241 can consult the configuration database 253 to find what LSAR to contact for area A, or it can base its decision by looking at the topology view itself. More sophisticated decision algorithms may be readily implemented which advantageously require little to no intervention from a human operator.

LSA REFLECTOR. The LSA reflector 161, 162, 163 in FIG. 1 is responsible for collecting and forwarding topology information to the LSAG 150. There are a number of possible ways to obtain such link state information. One way, for example, is by having the LSAR passively snoop on the LSAs that flow around the network. Another more advantageous way is to passively participate in the LSA flooding process without actively participating in the forwarding of packets, e.g. by establishing an "adjacency" with a router in the network. This approach exploits the stream of LSAs that OSPF already reliably floods throughout the network while minimizing possible disturbances to the operational network.

Such an embodiment may be readily constructed by modifying a conventional OSPF hardware router or OSPF routing software such as GateD or Zebra. Such modifications preferably include the following:

1. The LSAR should not originate any LSAs other than as indicated below to establish an adjacency with a router. The LSAR does not send out any link state update packets, which ensures that its router LSA never actually goes out.
2. The LSAR should not perform any shortest path first computation.
3. The LSAR should not take part in flooding. So, even if it is connected to two routers and receives a new instance of an LSA from one of the routers, it should not flood the LSA out to the other router. This is consistent with the fact that the LSAR does not send out any link state update packets.
4. The LSAR should not refresh LSAs, although it ages the LSAs while they reside in the link state database like a normal OSPF router. Since LSAR does not refresh LSAs, it never flushes an LSA out when its age reaches MaxAge, typically 1 hour.
5. The LSAR should not be allowed to become the designated router (DR) or the backup DR (BDR) on a local area network even if the configuration file specifies a non-zero priority for it.
6. The LSAR should accept any LSA it receives irrespective of whether the copy of the LSA is newer or older than the received copy.
7. The LSAR should not describe any LSAs in the Database Description packets other than its own Router LSA (described in database exchange but never transmitted over the link).

The main design goal for the LSAR is that it be passive. Though the LSAR "speaks" OSPF, it should not behave as a real router and it must not be involved in packet forwarding. No other router in the network should send data packets to the LSAR to be forwarded elsewhere. A natural line of defense against having the LSAR participate in normal forwarding is to use router configuration measures—assign effectively infinite OSPF weights to the links to the LSARs, and install on neighbor routers strict access control lists and route filters.

A more preferable method is to exploit standardized features of the OSPF protocol that permit links to the LSAR to carry LSAs from the routers, but do not permit neighbors to accept LSAs from the LSAR. This can be accomplished by keeping the LSAR-router adjacency in essentially a "hanging" state such that the two ends start the database synchronization but never finish it. One method to achieve this is to have the LSAR originate an LSA L and inform the router that it has this LSA during the synchronization process but never actually send it out to the router. This ensures that the database is never synchronized and hence the adjacency is never fully established from the router's perspective. As a result of this, the adjacent router never gets to advertise a link to the LSAR in its Router LSA although it sends all the LSAs it receives to the LSAR as part of the flooding procedure. A side benefit of this approach is that any instability in the LSAR does not impact other routers in the network. Based on practical experience with various commercial router implementations, the inventors have not seen any alarms generated by this procedure; the only side effect of this hanging adjacency appears to be repeated link state request packets sent by the router to acquire the LSA L from the LSAR.

Figure 6:
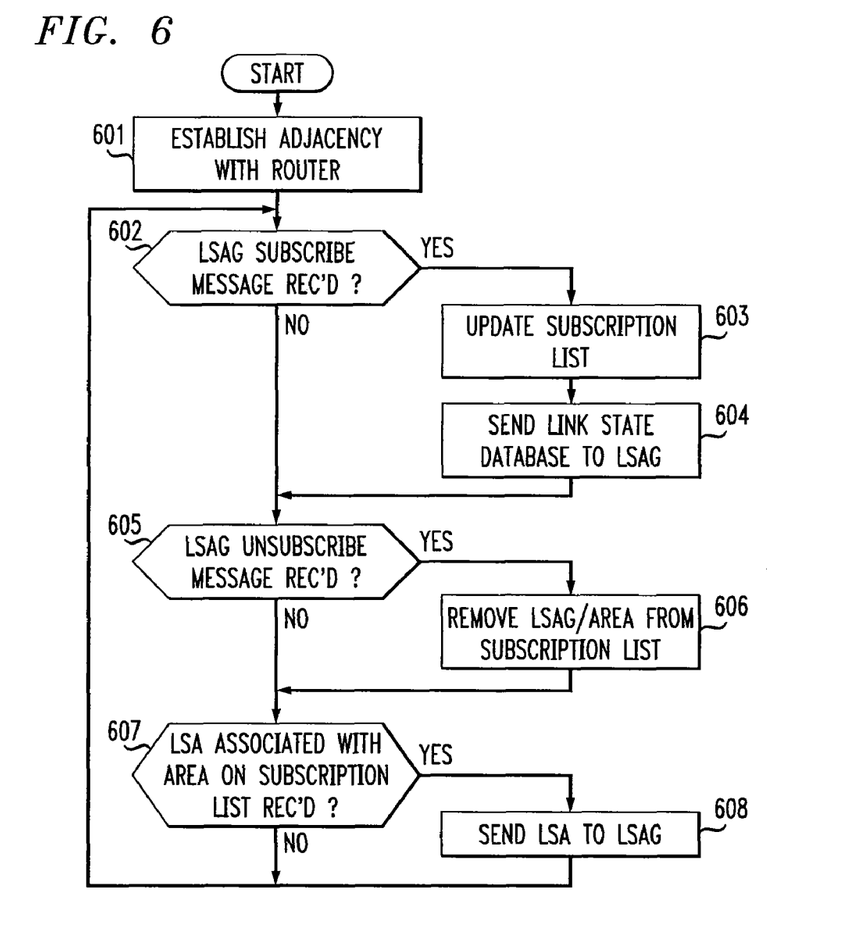
FIG. 6 is a flowchart of processing performed by an LSA reflector, in accordance with a preferred embodiment of the invention.

FIG. 6 is a flowchart of processing performed by an LSAR, in accordance with a preferred embodiment of an aspect of the invention. At step 601, the LSAR establishes an adjacency with a router in the area it is supposed to monitor, e.g. by using the procedure described above. At step 602, the LSAR checks to see if it has received any subscription messages from an LSAG. If it has, it updates a subscription list and includes the area id for which it is to be subscribed at step 603. At step 604, the LSAR sends its existing link state database to the subscribing LSAG. This is advantageous in that it avoids the lag in "booting" up a topology server that relies only on receipt of LSAs for ascertaining the topology of the network. At step 605, the LSAR checks for any messages from an LSAG to unsubscribe. If any such message is received, then at step 606 the LSAR proceeds to remove the LSAG and the associated area from its subscription list. Finally, at step 607, the LSAR checks to see if it has received any LSA associated with a subscribed area on the subscription list. If it has received such an LSA, then at step 608 the LSAR forwards it to the relevant LSAG on the subscription list using the LSAG-LSAR protocol described below. Accordingly, for every area in the subscription list associated with an LSAG, the LSAR sends every LSA that it accepts into the area's link state database to the LSAG.

The above LSAR architecture advantageously does not require any modifications to existing conventional routers in a pre-existing packet-switched network. It should be noted however that the function of the LSAR can be readily incorporated into that of a conventional router. The router need only by enhanced to implement the LSAG-LSAR protocol described below.

Figure 7:
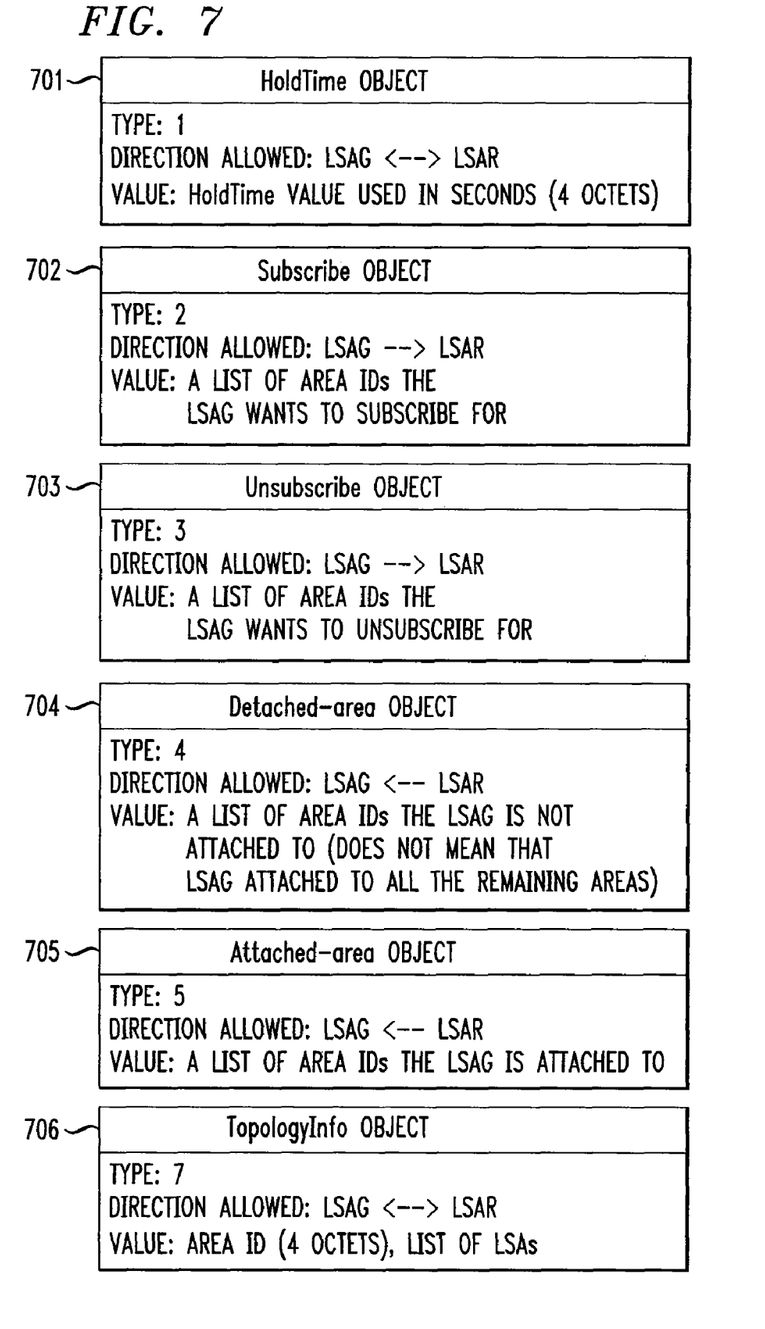
FIG. 7 is an illustrative specification of data objects exchanged between an LSA aggregator and an LSA reflector during a session.

LSAG-LSAR PROTOCOL. The communication between an LSAG and an LSAR can utilize any underlying transport mechanism and advantageous communication protocol. FIG. 7 sets forth a useful specification of object formats to be exchanged between the LSAG and the LSAR. The objects can be encapsulated in one or more messages and sent over a TCP connection. Each message can contain a header, for example, which specifies a destination ID, a source ID, and a length. Where the destination/source is an LSAR, its ID should be its OSPF router ID. Where the destination/source is an LSAG, it should be the IP address of one of its interfaces. It is recommended that the LSAG uses the same IP address in all the messages it generates. The objects shown in FIG. 7 can be encoded, e.g., in a type-length-value format.

A session is initiated by an LSAG: the LSAG acts as a client and the LSAR acts as a server in the session. The HoldTime object 701 is useful for managing sessions between an LSAG and the LSARs. Once a session has been established, each end can ensure that it sends at least one message within a "keep alive" period. At the end of the period if a node does not have an object to send, it sends an empty message. If a node does not receive any message from the other end with a value specified in a HoldTime object, it assumes that the other end is dead and terminates the session. Once the session is established, the LSAG can subscribe or unsubscribe to the LSAR for any area at any time using the Subscribe object 702 and the Unsubscribe object 703 respectively. The area ID can be represented the same way it is in OSPF. A special wild-card can be used when the LSAG wants to subscribe for all the areas the LSAR is attached. As described above, the LSAR keeps track of all the areas the LSAG is currently subscribing for in a subscription list. The LSAR may not be attached to all of the areas that the LSAG is subscribing for. If that is the case, the LSAR sends back a message with a Detached-area object 704. Similarly, if the LSAR gets attached to an area at some point, it sends an Attached-area object 705 to the LSAG. As mentioned above, the LSAR sends every LSA that it accepts into an area's link state database where the area is in the subscription list associated with an LSAG. These LSAs are sent out in TopologyInfo objects 706.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. For example, the detailed description describes an embodiment of the invention with particular reference to OSPF and IP packet routing. However, the principles of the present invention could be readily extended to other protocols. For example and without limitation, the present invention can be readily extended to MPLS and variations on MPLS (such as MPLambdaS or GMPLS) which employ interior gateway protocols such as OSPF for topology discovery. Such an extension could be readily implemented by one of ordinary skill in the art given the above disclosure.

The invention claimed is:

1. A method of tracking the topology of a packet-switched network comprising:
    (a) passively monitoring link state advertisements flooded through the network by routers in the network participating in a link state routing protocol, wherein the link state advertisements are passively monitored using reflectors established in adjacency with the routers in the network without participating in the link state routing protocol; and
    (b) using information in the link state advertisements to construct a topology view of the network.

2. The method of claim 1, wherein topology view is constructed by an aggregator in communication with the reflectors established in adjacency with the routers in the network.

3. The method of claim 1, wherein the link state routing protocol is OSPF.

4. A system for tracking the topology of a packet-switched network comprising:
    one or more reflectors which are capable of passively monitoring link state advertisements flooded through the network by routers in the network participating in a link state routing protocol, wherein the one or more reflectors do not participate in the link state routing protocol; and
    an aggregator which is capable of receiving topology information from each of the reflectors and constructing a topology view of the network.

5. The system of claim 4, wherein the link state advertisements are monitored by establishing an adjacency with the routers in the network.

6. The system of claim 4, wherein the link state routing protocol is OSPF.

7. A processor-readable storage device having stored thereon a plurality of instructions, the plurality of instructions including instructions which, when executed by a processor, cause the processor to perform the steps of a method of tracking the topology of a packet-switched network, comprising:
    (a) passively monitoring link state advertisements flooded through the network by routers in the network participating in a link state routing protocol, wherein the link state advertisements are monitored using reflectors established in adjacency with the routers in the network without participating in the link state routing protocol; and
    (b) using information in the link state advertisements to construct a topology view of the network.

8. The processor-readable storage device of claim 7, wherein topology view is constructed by an aggregator in communication with the reflectors established in adjacency with the routers in the network.

9. The processor-readable storage device of claim 7, wherein the link state routing protocol is OSPF.

* * * * *